Dec. 27, 1966    J. D. SCOTT    3,295,036
SILICON CONTROLLED RECTIFIER-SATURABLE REACTOR CONTROL
Filed Sept. 26, 1963    3 Sheets-Sheet 1

INVENTOR.
J. DENNY SCOTT
BY
HIS ATTORNEY

Dec. 27, 1966    J. D. SCOTT    3,295,036
SILICON CONTROLLED RECTIFIER-SATURABLE REACTOR CONTROL
Filed Sept. 26, 1963    3 Sheets-Sheet 3

INVENTOR.
J. DENNY SCOTT
BY
*William D. Carothers*
HIS ATTORNEY

United States Patent Office 3,295,036
Patented Dec. 27, 1966

3,295,036
SILICON CONTROLLED RECTIFIER-
SATURABLE REACTOR CONTROL
Junius Denny Scott, Homer City, Pa., assignor to
Link-Belt Company, a corporation of Illinois
Filed Sept. 26, 1963, Ser. No. 311,909
6 Claims. (Cl. 318—132)

This invention relates generally to an electronic control system for varying one or varying proportionally a series of independently operating variable load units in fixed proportion to each other through a single control element and more particularly to a control circuit for a variable load that is connected in series with a silicon power rectifier and a toroidal core saturable reactor connected in series across alternating current and where the load is varied by the saturable reactor through a gate circuit of a silicon controlled rectifier connected in multiple with the power rectifier to supply saturable back current flow to the saturable reactor which gate circuit is electronically controlled by a single variable master.

The thyratron control, the standard shunt-type control and the variable reset reactor control of one or of a series of variable loads, such as vibratory feeders independently supply different ingredients to different mixes or to a common mix, leave much to be desired in the consistency of operation, the variance in the units, the dependency on the life and consistency of tubes, and the accuracy and uniformity of operation.

One object of the control circuit comprising this invention is referred to as ERC or electronic reactor control which includes a toroidal core saturable reactor and a variable controllable load connected in series with a power semiconductor across an alternating current. The control is gained by the use of a silicon controlled rectifier inversely connected in parallel to said power semiconductor. This much of the circuit provides a mutual protective feature in that the silicon controlled rectifier designated as SCR and the power semiconductor, whether a silicon or other type of semiconductor, mutually protect each other against harmful inverse voltages because of their ability to shunt or by-pass harmful inverse voltage since they are connected inversely relative to each other. This represents the first portion of this invention. Thus no harmful inverse voltages are impressed on the power rectifier or the silicon controlled rectifier. This invention thus permits the use of rectifiers with lower watt-second ratings in series in the feeder circuit. If the silicon power rectifiers are employed, only one instead of two or four would be necessary for use in a circuit rated at more than 400 PIV, peak inverse voltage, regardless of the voltage rating of the feeder.

Another object of the control circuit comprising this invention is that this control circuit is completely static in operation. It employs no tubes. The power rectifier and the silicon control rectifier have unlimited life. The life expectancy of this control circuit is thus similar to that of a transformer, which is practically unlimited.

Another feature which is an important object of this invention lies in the fact that no special tapered rheostats are needed, no ganged rheostat assemblies are necessary as a master control. This not only simplifies the structure, but eliminates mechanical failures common to master control circuit.

Another object is the improved control obtained in the use of the circuit comprising this invention.

Other objects and advantages appear hereinafter in the following description and claims.

The accompanying drawings show for the purpose of exemplification without limiting the claims thereto, certain practical embodiments wherein;

Figure 1A:
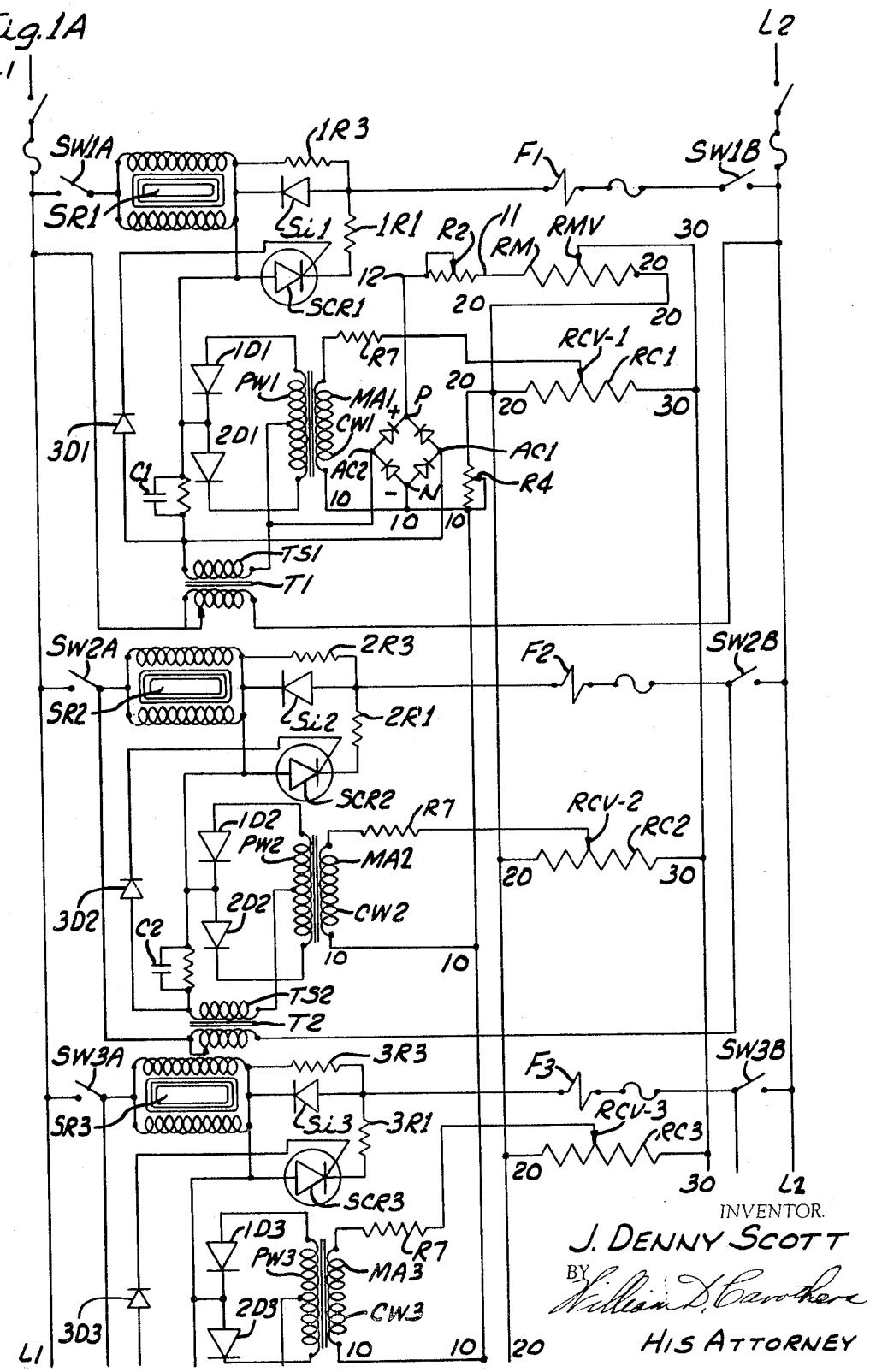
FIGS. 1A and 1B are diagrammatic views showing a single master control circuit for five independently operated feeder motors.
Figure 1B:
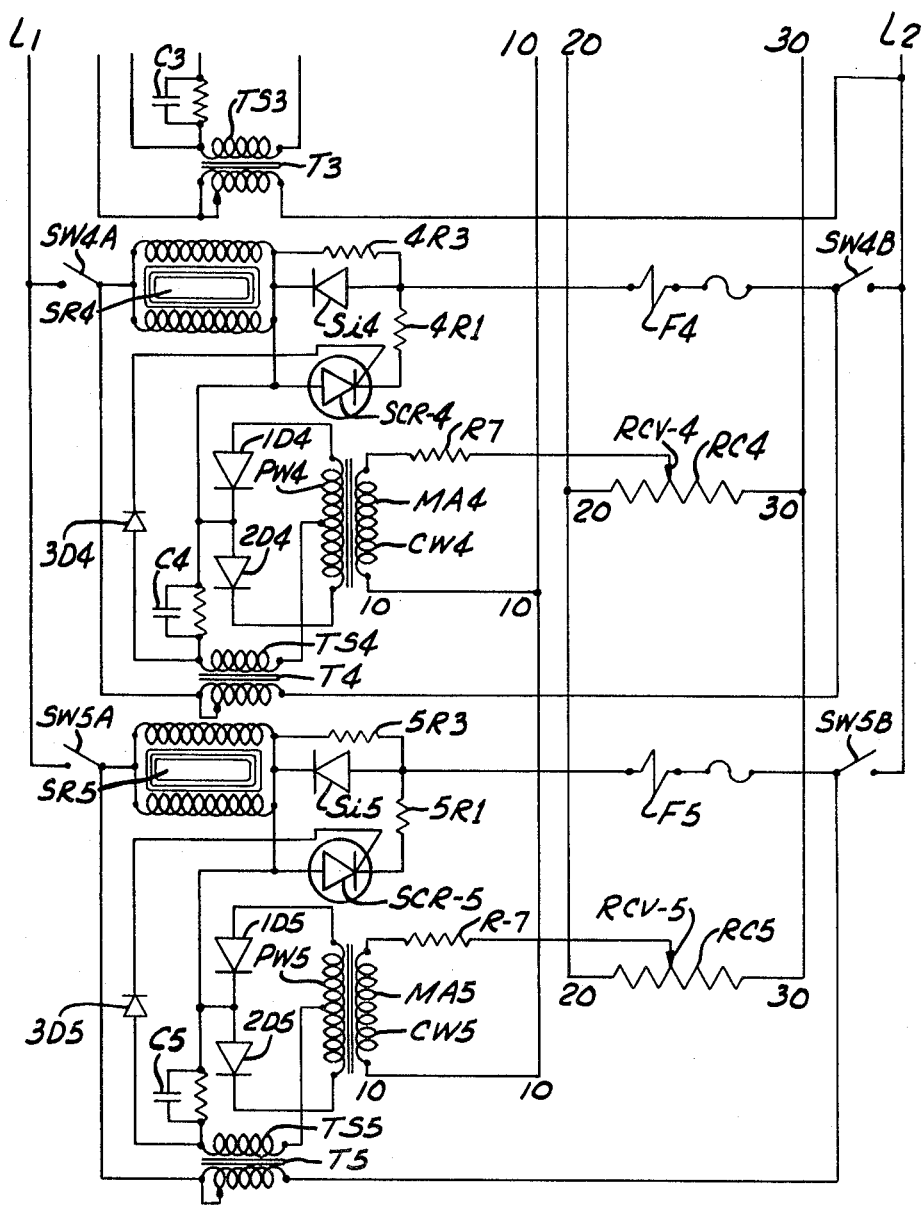

FIGS. 1A and 1B represent five operating load or feeder circuits with a master control RM and direct current power means in the first operating load circuit. Each operating circuit controls its own individual load and each can be connected or disconnected individually from the supply lines L1 and L2 with the exception of the first operating load circuit in FIG. 1A which is connected directly across the supply lines L1 and L2.

Referring to FIG. 1A the alternating current lines L1 and L2 supply this control circuit through the line fuses indicated. Switches SW1A and SW1B connect voltage to the first load circuit which includes the toroid core saturable reactor SR1 in series with the power semiconductor indicated as $Si1$ and the controllable load L1 in the form of the electromagnetic vibratory feeder F1 and a circuit fuse. The other toroid core saturable reactor SR2 to SR5 are each independently connected with their respective semiconductor $Si2$ to $Si5$ and respective controllable load F2 to F5 to the lines L1 and L2 through their respective switches $Sw2$ to $Sw5$.

Each toroidal core reactor SR has endless cores with an endless winding with circuit connections at diagonally opposite positions forming two independent windings connected in parallel.

Each power semiconductor $Si$ may be a power silicon diode with an anode and a cathode and because of the mutual protective features in this circuit only one diode is needed for peak inverse voltage.

A silicon controlled rectifier, SCR is provided for each power rectifier and are so numbered. The silicon control rectifiers SCR1 to SCR5 each have an anode and a cathode and a gate and they are connected reversely in parallel with their respective power semiconductor $Si$. Thus the anode and the cathode of the power semiconductor $Si$ are connected respectively and directly to the cathode and the anode of its respective silicon controlled rectifier. This provides mutual protection between one another from peak inverse voltage. Thus one semiconductor shunts the high inverse peak voltages for the other. This saves both of these semiconductors, and is an important advantage in this invention.

The silicon controlled rectifiers are preferably PNPN type semiconductors because of their ease to trigger into operation due to effective use of junction area for current conduction and, therefore, makes it a higher voltage device than most silicon transistors.

A limiting current resistance 1R1 is connected between the cathode of the power semiconductor $Si1$ and the anode of the silicon control rectifier SCR1.

A resistance 1R3 is connected in parallel with the two semiconductors $Si1$ and SCR1 to suppress any unwanted oscillation.

An isolating transformer T1 has its primary connected directly to lines L1 and L2 to provide constant voltage on the master resistance rheostat RM which controls the voltage suplied to all of the individual control resistances RC1 to RC5. The master resistance RM and each control resistance RC1 to RC5 have their own variable connection as indicated at RMV and RCV1 to RCV5 for each load operating circuit.

Each load operating circuit is also provided with a magnetic amplifier MA1 to MA5. Each magnetic amplifier has a power winding PW and a saturable control winding CW. The power winding has a center tap connected to one end of the secondary of the isolation transformer TS and the ends of the power winding PW are connected to the opposite ends of a pair of diodes 1D and 2D for each independent and respective load operating circuit. Both the master rheostat RM and control rheostats RC1 and RC5 will vary the magnitude of the direct current to corresponding control winding CW1 to CW5 of each of the magnetic amplifiers MA1 to MA5. The magnetic amplifiers transform this direct current supplied from the rectifier bridge into a suitable wave shape which is used to control the silicon controlled rectifier SCR. The resultant effect is that the SCR acts like a variable resistance through the rheostat control when connected across the silicon power rectifier S*i*. This is true for all load operating circuits in operation.

The magnetic amplifiers MA in the gate control circuit are to obtain a desirable step wave front of gate current with a convenient low level direct current control.

The diodes 1D and 2D of each load operating circuit prevent any reverse current through power winding PW of the magnetic amplifier MA which would cause the core of the magnetic amplifier not to saturate but to reset in reverse direction saturable magnitude which is undesirable. The diodes *e*D1 to 3D5 prevent any reverse voltage and/or current on the gate of the corresponding SCR.

The secondary winding TS1 also supplies the full wave rectifier bridge having the alternating current connections AC1 and AC2 connected across the secondary TS1. The negative corner N of this rectifier bridge is connected by the line 10 to the respective magnetic amplifier control windings CW1 to CW5 and by the line 10 to one end of the resistance RM and to one end of each of the resistances RC1 to RC5. The line 10 also connects the lower end of the control winding CW1 of the magnetic amplifier MA1 and completes the common connection for each magnetic amplifier in each respective load operating circuit. A potentiometer R4 is connected between lines 10 and 20 and these lines differ in voltage by the drop across this variable resistance R4.

The opposite end of the master resistance RM is connected by the line 11 through the variable resistance R2 connected as a potentiometer, and the line 12 to the positive connection P of the full wave rectifier bridge.

The opposite end of the control resistance RC1 is connected by the line 30 to the variable connection RMV of the master resistance RM. The lines 20 and 30 are also common to the opposite ends of each of the control resistances RC1 to RC5.

Each control resistance has its variable connection RCV1 to RCV5 connected by corresponding lines to the other end of their magnetic amplifier control windings CW1 to CW5 respectively with an intervening resistance R7.

The line 10 functions as a common connection connecting the lower end of each of the magnetic amplifier control coils CW1 to CW5 to each other.

And lines 20 and 30 represent the master voltage control lines for each of the control resistances RC1 to RC5 for the series and all being controlled by the voltage of the single master control resistance RM so that each variable controllable load or feeder motor F1 to F5 may be proportionately changed from its original setting to any increment thereof for proportionate increase or decrease of the voltage from a change of the master resistance RM.

The cathode of each silicon controlled rectifier SCR1 to SCR5 is connected by a corresponding line, not only to the anode of each companion power rectifier S*i*1 to S*i*5, but also the mid connection between the pair of diodes 1D1 and 2D1 to 1D5 and 2D5 respectively.

The gates of each of the respective silicon controlled rectifiers SCR1 to SCR5 are each connected to one side of their respective transformer secondaries TS1 to TS5 which is that end of the transformer winding that is opposite to the end connected to the center tap of the respective magnetic amplifier power windings PW1 to PW5.

It will be noted that the switches SW1A and SW1B connecting the first operating circuit of the feeder F1 to the lines L1 and L2 does not control the primary winding of the isolating transformer T1 which is directly connected across the lines L1 and L2. The reason for this is to enable one always to provide voltage for the master control resistance RM regardless of whether all or just one of the feeders F1 to F5 is operating. Each of the other switches SW2A and SW2B to SW5A and SW5B control the supply of alternating current to their respective isolating transformers T2 to T5. Thus when any or all of these feeders F2 to F5 are in service their corresponding switches supply their corresponding isolation transformer primaries. This makes the master resistance control RM independent of any feeder or load operating circuit.

Figure 2:
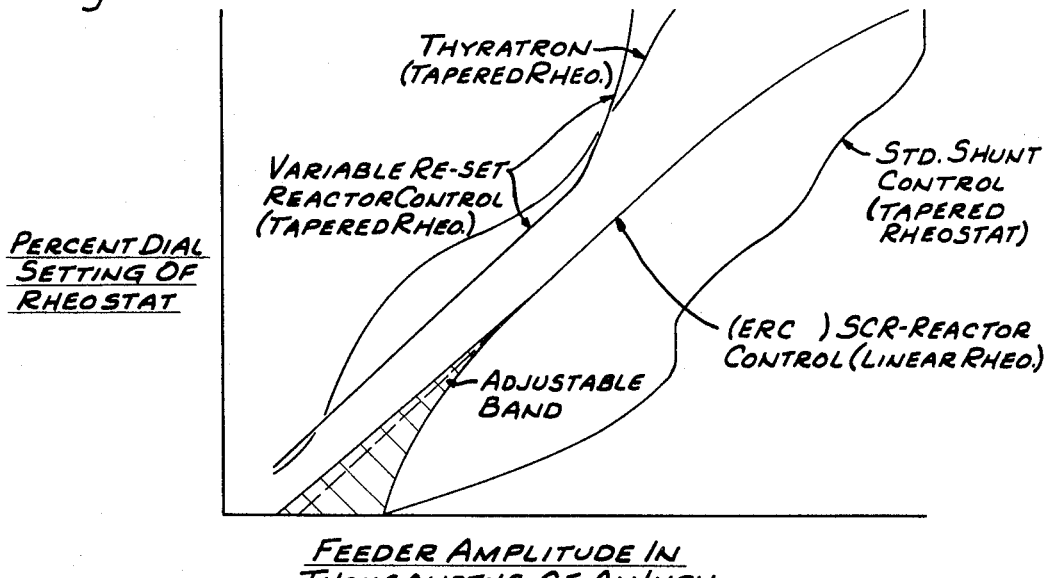
FIG. 2 is a graph showing the operating curves of the present invention as well as other types of control presently used.

Referring to FIG. 2 the graph is self-explanatory in that the threolyratron control using a tape rheostat has a waving amplitude control-per percent dial setting which comprises a curve line that eventually inclines at a steeper angle. The feeder amplitude would not increase at a steady or contstant rate with a proportionate change in the dial setting of the rheostat. The same percentage change at one setting of the rheostat would increase amplitude at a faster rate than at another setting. Therefore, there is no uniform control of feeder ampltiude.

The variable reset reactor control with a tapered rheostat starts out with a uniform lineal control curve, then curves upwardly at a steep angle. The control of these first two systems by the rheostat ends before the amplitude reaches the highest possible reciprocation for the feeder or feeders. These controls are not as desirable as the other two controls explained below.

The standard shunt control with a tapered rheostat is quite wavy but permits a higher reciprocation of the feeder or feeders. The curve then turns upward sharply.

The control comprising this invention which is referred to as ERC or electronic reactor control which employs a silicon control rectifier reversely coupled in parallel with the power rectifier to provide mutual protection to both of these semiconductors as well as change the wave form across the saturatable reactors SR for changing the extent of the energy valved to operate the feeder. This it will be noted provides the best lineal control using an ordinary rheotast. The circuit is adjustable from a considerable range from four to sixteen thousandths of an inch amplitude.

Figure 3:
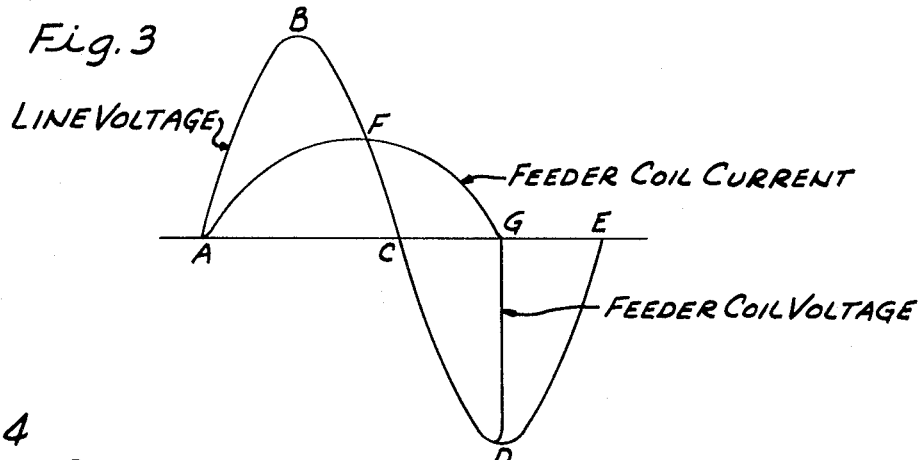
FIG. 3 is a graph illustrating maximum theoretical wave forms that are characteristic of the circuit comprising this invention.

The graph of FIG. 3 illustrates the maximum theoretical wave forms of the circuit comprising this invention. As shown A B C D E is the line voltage sine curve. A B C D G is the load or feeder coil voltage when the master rheostat MR is set to operate the feeder at maximum amplitude. The curve AFG is the feeder coil current impulse. Thus proper inverse current to reactor SR is maintained.

It should be noted that this inverse current is zero at high operating voltage. There is no leakage current when the maximum saturation point is obtained in the saturable reactor, SR.

Figure 4:
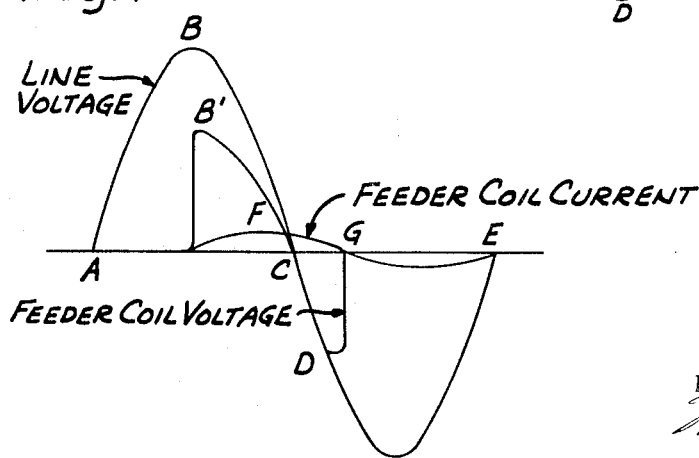
FIG. 4 is a graph illustrating theoretical wave forms of one-half the intensity of FIG. 3 comprising this invention.

FIG. 4 represents the same theoretical curves as FIG. 3 except that in FIG. 4 the voltage on the feeder coil is reduced to one-half of that as shown in FIG. 3 by increasing the gate voltage on the SCR through the master rheostat, MR, in the operating load or feeder circuit. It is evident from this figure that there will be a reduction in the vibratory amplitude of the feeder due to not only the smaller wave form A B' C D G but also due to a sooner cutoff point G in FIG. 4 as compared with the same point in FIG. 3. Also there is a slight inverse current flow GE through the SCR at this lower operating voltage.

As a control rheostat RC is varied, the phase angle of the corresponding SCR conduction cycle (the positive half cycle) is advanced or retarded thereby shunting more or less current across the corresponding power semiconductor Si. This current as controlled by the control rheostat RC in turn controls the amount of reset (control of resaturation) on the corresponding saturable reactor SR which results in a controlled amount of impedance in series with the feeder or load. Thus by controlling the series impedance of the saturable reactor SR, the voltage to the feeder magnet coil or load is regulated. This is due to only the breakdown characteristics of the SCR and small resistance characteristics in the circuit. This current may increase as the feeder amplitude decreases but the operation of this control still remains primarily lineal. At very low feeder amplitude, correction of lineal operation can be made in the adjustable band area.

The operation of the feeder or any load, as a matter of fact, through the use of a SCR reactor control provides a feed-rate, where a feeder is employed, which is directly proportional to the master rheostat control MR. Therefore, once the feed rate for a particular material is identified on the master rheostat dial setting, the rheostat may be then calibrated in terms of different feed rates. Furthermore, the control rheostats RC1 to RC5 of the several feeders being employed, may be calibrated or adjusted to regulate initially the amount or rate of flow of each particular material being fed from each feeder. Each feeder then deposits the correct amount of each material on a moving conveyor belt or other place of deposition to make the desired blend. Once the desired proportions of material have been set and adjusted and the blend established, the master rheostat may be used to vary the amount or tonnage of the blended material coming from the belt to suit a particular process being employed. However, the percentage of each material in the blend will remain the same.

This type of control would not be limited to the above application, but could be used in any other process which requires a continuous blending or batching.

Control of all these feeders through the master control MR gives the operater opportunity to make an over-all final and accurate adjustment of the rate of flow. This is all made possible due to the lineal operation brought about by the SCR reactor control ERC. This type of control, therefore, has wide application not only in vibratory feeder operation, but also in other industrial applications, and further examples of control would be too numerous to illustrate.

However, another important illustration is that the control rheostats RC1 to RC5 for each feeder may be set at any desired flow rate which may be necessary to produce a certain blend of materials, each control rheostat feeding one material for blending. The master rheostat RM will control the over-all flow rate of the blended material.

I claim:

1. A control circuit consisting of a power semiconductor having an anode and cathode and placed in series with a saturable reactor and a variable controllable load for connection across an alternating current source to operate the variable controllable load on unidirectional current impulses and to vary the output of the load, a load control circuit including a silicon control rectifier with anode, cathode and gate having its anode and cathode connected reversely with respect to said cathode and anode of said power semiconductor and a gate control circuit to vary the back current through said saturable reactor and effectively vary the operation of said load, said gate control circuit includes a resistance having a variable mid connection, a source of direct current connected in parallel with said resistance, a magnetic amplifier having a saturable control winding with one end connected relative to said variable resistance mid connection and its other end connected to the negative of said direct current supply to vary the degree of saturation of said magnetic amplifier and the control therefor, a power winding with a center tap on said magnetic amplifier, a pair of diodes connected in series and in a circuit connected to the ends of said power winding, an alternating current source having one side connected to said center tap and the other side connected to said gate, a connection completing said gate load circuit from said silicon control rectifier cathode to between said pair of diodes, an adjustable magnetic amplifier load resistor with a parallel load condenser connected between said gate and said silicon control rectifier cathode.

2. A control circuit consisting of a power semiconductor having an anode and cathode and placed in series with a saturable reactor and a variable controllable load for connection across an alternating current source to operate the variable controllable load on unidirectional current impulses and to vary the output of the load, a load control circuit including a silicon control rectifier with anode, cathode and gate having its anode and cathode connected reversely with respect to said cathode and anode of said power semiconductor and a gate control circuit to vary the back current through said saturable reactor and effectively vary the operation of said load, said gate control circuit includes a master resistance having a variable connection, a source of direct current connected in parallel with said master resistance, a load control resistance connected between said variable connection of said master resistance and the negative direct current source, a variable connection for said load control resistance, a magnetic amplifier having a power winding and a saturable control winding with one end attached to said load resistance control variable mid connection and its other end attached to the negative of said direct current supply, both said master and said load control resistances determining the direct current supplied to said saturable control winding, a power winding with a center tap on said magnetic amplifier, a pair of diodes connected in series in a circuit connected to the ends of said power winding, an alternating current source having one side connected to said center tap and the other side connected to said gate, a connection completing said load circuit from said control rectifier cathode to between said pair of diodes.

3. The control circuit of claim 2 wherein a magnetic amplifier load resistor with a parallel load condenser connected between said pair of diode and said gate.

4. The control circuit of claim 3 wherein said control circuit is multiplied by a series of control circuits each containing a power semiconductor placed in series with a saturable reactor and a variable controllable load and connected across the alternating current source and each with a silicon controlled rectifier connected in a similar load control circuit for each multiplied circuit wherein the load control resistance of each gate control circuit of the multiplied series is connected in multiple with said load control resistance of said first circuit so that all of said load control resistance in parallel may be proportionately controlled by said master resistance.

5. The control circuit of claim 2 wherein said control circuit is multiplied by a series of control circuits each containing a power semiconductor placed in series with a saturable reactor and a variable controllable load and connected across the alternating current source and each with a silicon controlled rectifier connected in a similar load control circuit for each multiplied circuit wherein the load control resistance of each gate control circuit of the multiplied series is connected in multiple with said load control resistance of said first circuit so that all of said load control resistance in parallel may be proportionately controlled by said master resistance.

6. A feeder control consisting of a feeder motor connected in series with a semiconductor and a saturable reactor, a silicon controlled rectifier and a resistor connected in series therewith and connected in parallel with a second resistance and said semiconductor, the cathode of said semiconductor connected to the anode of said silicon controlled rectifier, being connected together to provide a reverse connection therebetween to permit them to mutually protect each other, a gate control circuit for the gate of said silicon controlled rectifier and connected between the gate cathode and including a variable resistance supplying direct current to the control winding of a magnetic amplifier, the power winding of which supplies predetermined wave forms variable by said resistance to affect the saturation of said saturable reactor through the back current supplied by said gate of the silicon controlled rectifier.

References Cited by the Examiner

UNITED STATES PATENTS

| | | |
|---|---|---|
| 2,807,768 | 9/1957 | Sherlock et al. |
| 3,072,838 | 1/1963 | Hetzler et al. |
| 3,179,866 | 4/1965 | Doyle et al. _____ 318—125 |

OTHER REFERENCES

German application No. 1,088,550, Marhold, September 1960.

ORIS L. RADER, *Primary Examiner.*

S. GORDON, J. C. BERENZWEIG,
*Assistant Examiners.*